Sept. 20, 1932.  W. R. GRISWOLD  1,878,128
VALVE SPRING
Filed Nov. 10, 1927  2 Sheets-Sheet 1
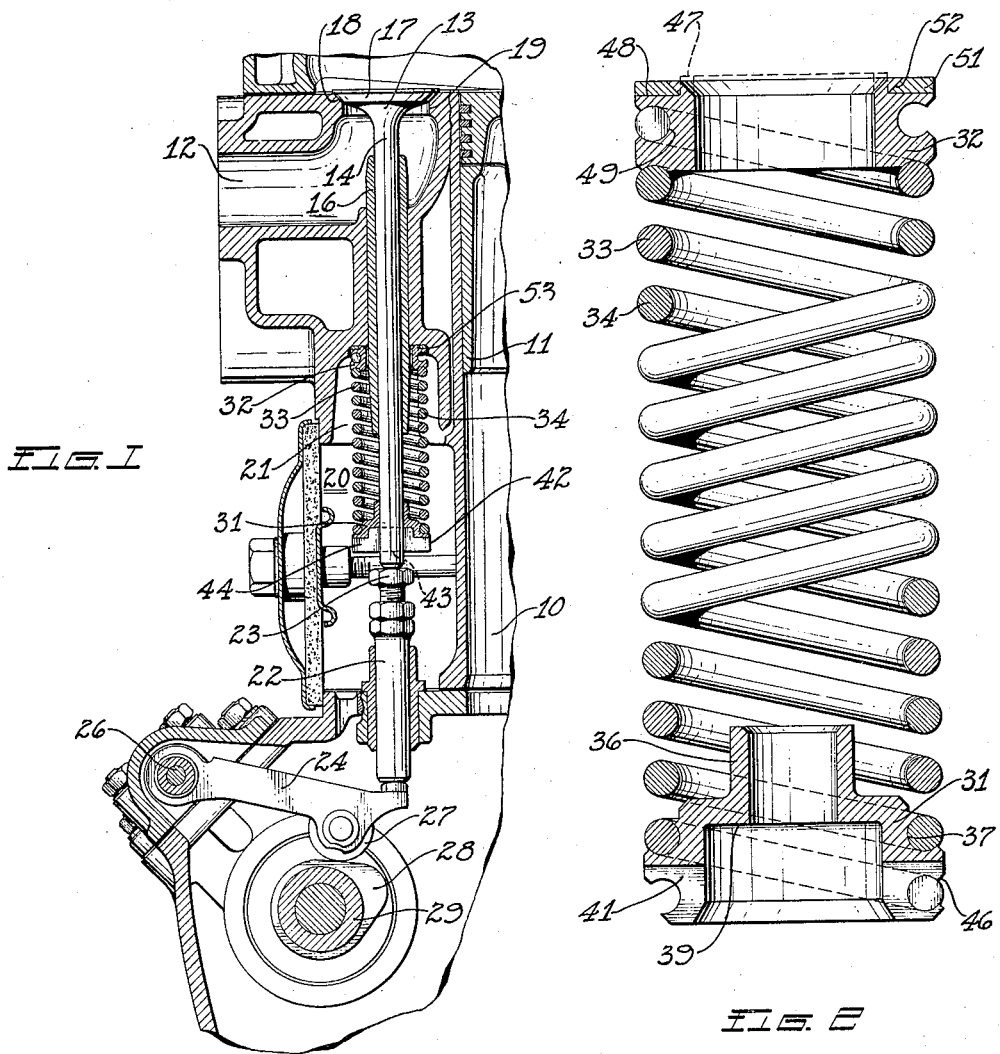
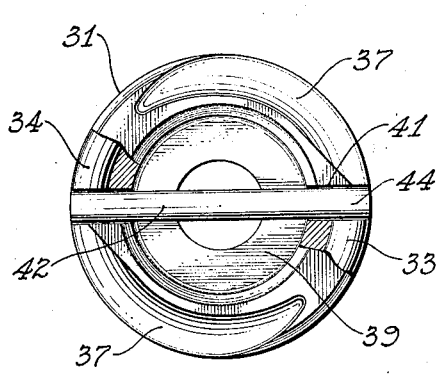
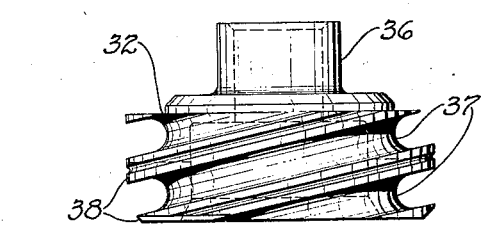
Inventor
WALTER R. GRISWOLD.
By
Attorney

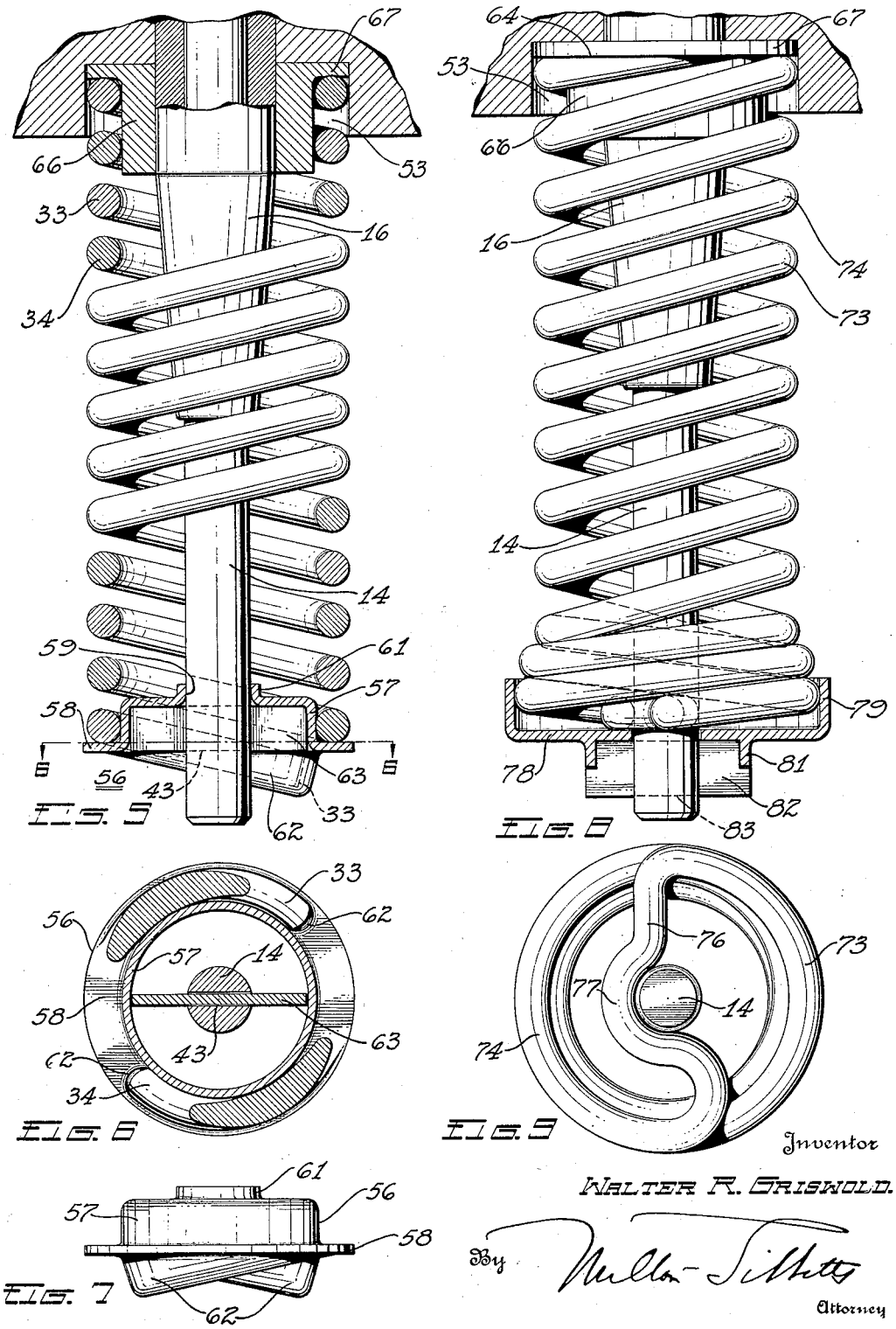

Patented Sept. 20, 1932

1,878,128

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

VALVE SPRING

Application filed November 10, 1927. Serial No. 232,241.

This invention relates to valve mechanism for internal combustion engines and more particularly to the spring device whereby the valves of such engines are closed and against the action of which they are opened by the valve operating mechanism.

It has for one of its objects to provide a valve spring mechanism which shall be free from vibratory disturbances at any speed within the engine range, whereby spring breakage shall be prevented, and engine operation improved.

Another object of the invention is to provide a valve spring having a natural frequency of vibration above the frequency of the impulses of the valve mechanism at speeds within the engine range.

Another object of the invention is to provide a valve spring sufficiently stiff to secure the desired high frequency of vibration without being so large as to take up an excessive amount of space on the engine, and adapted to so load the valve operating mechanism as to maintain the contacting parts thereof, and particularly the cam follower and cam, in engagement at all engine speeds without subjecting the spring coils to excessive stress.

A further object of the invention is to provide a retainer for engine valve springs which shall rigidly hold a plurality of spring elements in proper relation to form a simple, compact and efficient valve spring device.

Other objects of the invention will appear from the following description taken in connection with the drawings, which form a part of this specification, and in which:

Fig. 1 is a view, partially in elevation and partially in transverse section through part of an internal combustion engine having valve operating mechanism constructed in accordance with this invention;

Fig. 2 is an enlarged view, partially in elevation and partially in longitudinal section through the valve spring device shown in Fig. 1;

Fig. 3 is a bottom view of the spring device shown in Fig. 2, showing the valve stem key in place;

Fig. 4 is a detail in elevation of the lower spring retainer or abutment shown in Fig. 2;

Fig. 5 is a longitudinal section, partially in side elevation, of a similar valve spring device having a modified form of terminal or abutment;

Fig. 6 is a section taken substantially on the line 6—6 of Fig. 5;

Fig. 7 is an elevation of the abutment shown in Fig. 5;

Fig. 8 is a view in side elevation of another form of the valve spring device, and Fig. 9 is a bottom view of the spring device shown in Fig. 8, with the abutment removed.

It has been discovered that valve spring failure at the high speeds now commonly used in internal combustion engines is largely caused by the synchronization of the natural frequency of the valve springs with the frequency of the valve operating mechanism, thus causing a condition of resonance in which the stresses in the springs are greatly increased. This is manifested by a dancing or surging motion of the spring, readily discernible under stroboscopic observation, which has a detrimental effect on valve operation, and consequently on engine performance. Many of the valve springs in common use today vibrate badly in this manner in the upper portion of the engine speed range. It has heretofore been proposed to prevent such vibration by providing a valve spring having its natural frequency above the frequency of the impulses of the valve operating mechanism at any possible engine speed.

The natural frequency of a spring may be increased by increasing the ratio of its stiffness to the weight of its active turns. This may be accomplished in a single coil in various ways, but it usually results in a stress range and a maximum stress which are too high to be safe, so that failure occurs from fatigue even though no resonant vibration occurs. To prevent such over-stressing it has been heretofore proposed to divide up the total spring load among a number of coils of small diameter. However, such a device occupies much more space than a single coil spring, and there are many engines in which space limitations inherent in the engine design prohibit much change in the form of the coils.

In some engines having valve mechanism with heavy top-load requirements, a device has been used consisting of two springs, one surrounding the other. In such devices, however, the springs share the load in the ratio of their stiffnesses or rates of action, so that one of the springs is usually over-stressed and fails before its companion. It has not been found practicable to increase the stiffness of a given spring by increasing the wire size therein, nor by decreasing the number of turns in the coil, since these changes both result in greatly increase stresses, and stress ranges.

In any given engine it is desirable, in general, to secure a spring of maximum stiffness and minimum weight while keeping the stress and the stress range within safe limits. To this end, the present invention provides a simple and reliable valve spring device in which the stiffness is such that spring vibration is prevented or greatly reduced, without exceeding safe stresses in the spring coils, and without occupying too much space on the engine.

Referring to the drawings in Fig. 1 is shown part of an internal combustion engine to which the invention is applicable, having a cylinder block defining cylinders 10, in each of which is slidably mounted a piston 11. Each of the cylinders has intake and exhaust passages 12 controlled by suitable valves 13. The invention has been illustrated in connection with the operation of a poppet valve, but it is to be understood that it is not limited to valves of this type, but may be applied to any valve of which the motion is controlled, in whole or in part, by a spring device.

The valve 13 has the usual stem 14, slidably mounted in a guide 16 secured in the cylinder block, and it has a beveled portion 17 cooperating with a seat 18 formed in a port 19 in the passage 12. The valve is urged towards its closed position by a spring device 20, which is disposed in a valve spring chamber or recess 21 formed in the cylinder block. The spring device 20 cooperates at its upper end with the upper wall of this chamber 21, and at its lower end with the valve stem 14, there being a suitable connection between the valve stem and the spring at this point.

The valve stem is actuated to open the valve against the spring device 20 by any suitable mechanism. In the form shown this comprises a slidable tappet member 22 having an adjustable abutment 23 which is adapted to engage the lower end of the valve stem 14. The tappet member is operated by a rocker arm 24, pivotally mounted on the engine crankcase as at 26, and actuated through a roller 27 by a cam 28. The cam 28 is formed on a cam-shaft 29 driven in timed relation to the engine, so that the valve 13 is opened by the operating mechanism and is closed by the spring device 20 at the proper times in the engine cycle. As mechanism of this nature is well known in the art to which this invention relates, further description thereof is unnecessary.

The spring device 20 comprises a plurality of resilient helical coils of substantially the same diameter, arranged coaxially between terminal retainer members or abutments 31 and 32. In the embodiment illustrated there are two coils 33 and 34, forming a double helix, but it is to be understood that three or more of the helical coils may be used if desired. The end turns of these coils are rigidly secured in their proper angular position in the abutments 31 and 32, so that the coils have the proper lead or pitch, and the whole spring device 20 becomes a permanently assembled unit.

In the form of the invention shown in Figs. 2 and 3, the lower abutment 31 consists of a hollow cylindrical member, open at the bottom and having an upwardly disposed tubular extension 36, through which the valve stem 14 is adapted to pass. A double-spiral groove 37, corresponding in size and in pitch to the end turns of the coils 33 and 34, is provided on the outer surface of the member 31 and these grooves are formed with projecting marginal lips or edges 38, as clearly shown in Fig. 4, which edges may be conveniently provided by forming a small intermediate groove in the land or raised portion adjacent the grooves 37.

The abutment 31 is also provided with an internal shoulder 39, and its depending portion has transversely alined notches 41, disposed axially for the reception of a suitable key 42. This key 42 passes through a slot 43 in the valve stem and has a central portion which engages the shoulder 39. It is also provided with wing portions or ears 44 which engage in the notches 41 to prevent turning of the valve with respect to the spring device 20, the grooves 37 being intersected by these notches.

In securing the coils 33 and 34 to the abutment 31, the coils are first assembled by screwing them together into their proper relation, and they are then screwed into their respective grooves 37 until their ends are flush with the edges of the notches 41, so that when the key 42 is placed in position, the end of each of the coils will abut the side of one of the ears 44. The edges 38 are then peened or rolled tightly against the adjacent spring element so that the end portions of each of the coils 33 and 34 are rigidly clamped to the abutment, as is clearly indicated at 46 in Fig. 2.

The upper abutment 32 is somewhat similar in structure to the lower abutment just described. It comprises an annual member having an internal diameter somewhat greater than the diameter of the valve guide 16, and having an upwardly disposed flange 47 defining an external shoulder 48. The outer surface of the abutment is provided with spiral grooves 49, similar to the grooves 37 of the lower abutment, and these grooves intersect the plane of the shoulder 48 adjacent to the flange 47.

In assembly, a washer 51, having a beveled inner edge 52, is placed on the face of the shoulder 48 and the flange 47 is spun or peened outwardly against the beveled surface to rigidly secure the washer in place on the end of the abutment. The upper ends of the coils 33 and 34, are then ground off square with the axis of the spring and are screwed into their respective grooves 49 until the ends are seated against the washer 51, when the edges of the grooves are peened down against the coils to rigidly secure them to the abutment.

The upper abutment 32 is adapted to seat within a recess 53 formed in the upper end of the valve spring chamber 21 and surrounding the valve guide as shown in Fig. 1.

In Figs. 5, 6 and 7 is illustrated a modification of the spring device having a somewhat different form of retainer or abutment. In this arrangement the lower abutment 56 consists of a hollow cylindrical member 57 adapted to fit within the end of the coils 33 and 34, and having a radially extending flange 58. The abutment is provided on its upper face with an opening 59 of a size to make an easy fit on the valve stem 14, which opening is defined by an upturned flange 61. The abutment is open at the bottom. The flange 58 is provided with a pair of depressions or pockets 62, which may be conveniently formed by pressing or stamping, and which are oppositely disposed and arranged in the angle of the helix to receive and position the ends of the coils 33 and 34. The valve stem is slotted at 43, as previously described, for the reception of a key 63 which seats within the hollow member 57 to transfer the spring load from the springs to the valve stem. This key is retained endwise in the slot 43 by contact of its ends with the interior of the member 57, as is clearly shown.

At the upper end of the spring device the coils are ground off in a plane normal to the spring axis, as indicated at 64 in Fig. 8. This provides a square end for the spring, which may engage directly in the recess 53 shown in Fig. 1. A centering plug 66 may be used at the upper end of this spring device to increase the stability thereof, if desired, this plug being made a tight fit on the valve guide 16 to retain it in place, and having a flange 67 against which the spring is adapted to bear.

A further modification of the invention is shown in Figs. 8 and 9. In this arrangement, as illustrated, the coils 73 and 74 are formed or wound from a single piece of wire, and have a common portion 76 at their lower end as clearly shown in Fig. 9. In this embodiment, the lower turns of each of the coils are preferably wound on an increased diameter and with a decreased pitch, so that the spring flares out at the bottom, the last turns of each coil being in contact with the adjacent turns of the other coil. The common portion 76 connecting the coils 73 and 74, is provided with a bent or offset portion 77 so that it may pass around the valve stem 14 to prevent any interference at this point.

The larger and more closely wound turns at the base of this spring structure provide a heavier and more stable terminal portion for the device, which directly contacts a valve stem abutment 78. This abutment consists of a cupped member, preferably a stamping, having a peripheral retaining flange 79 which is adapted to center the spring and having a flange 81, downwardly disposed to cooperate with and retain the valve stem key 82. The key passes through a slot 83 in the valve stem 14 in a manner similar to that illustrated in Fig. 2. Any suitable abutment may be used at the upper end of the spring, such as the plug 66 previously described.

This spring device may be formed in any convenient way, as by first making the bend 77 in the central portion of a suitable length of spring wire, and then simultaneously winding the coils 73 and 74 on a collapsible mandrel which may be later withdrawn from the formed spring.

It will be evident that this invention provides a spring structure in which several spring coils are arranged in parallel so that the total load on the device is divided between them, thus greatly reducing the unit stress in the turns for a given load and size of spring. At the same time the number of turns in each of the coils is reduced, so that the stiffness ratio of each coil, and consequently the rate of action of the device as a whole is materially increased. In this way the natural frequency of vibration of the spring device is increased beyond the frequency of the operating mechanism at any normal engine speed, so that resonant vibration is prevented, and without unduly increasing the size of the device.

It will also be seen that the invention provides a unitary valve device in which the various parts are rigidly and permanently secured in their proper relation, thus facilitating the handling, sale and operation of the device.

While several specific embodiments of the invention have been herein described, which are deemed to be new and advantageous and may be specifically claimed, it is not to be understood that the invention is limited to the exact details of the constructions shown, as it will be apparent that changes may be made without departing from the spirit or scope of the invention.

Having thus described the invention, what is claimed and desired to be secured by Letters Patent is:

1. A spring device for high speed valves comprising coaxially arranged helical coils of substantially the same size, and a retainer member to maintain the angular disposition of said coils.

2. An engine valve spring comprising a pair of helical coils of substantially equal stiffness and physical dimensions, and clamping means for the end turns of each helix to permanently secure said coils in fixed coaxial relation.

3. A spring device for engine valves comprising resilient helices having substantially identical physical dimensions and properties, and retainers securing said helices in fixed angular relation.

4. A spring device for valves comprising coaxially arranged helical coils, and a retainer cooperating with the end turns of the coils to maintain the relative disposition thereof and forming an abutment for the device adapted for connection to the valve.

5. A spring device for high speed valves comprising coaxially arranged helical coils, and a retainer having depressions for the end turns of the coils to maintain the relative disposition thereof, and adapted to connect the device to the valve.

6. An engine valve spring device including a plurality of helical coils, and an abutment having grooves into which the end turns of said coils are threaded to secure them in a predetermined angular relation.

7. A valve spring device including a plurality of helical coils, and a terminal member having a corresponding spiral groove for the reception of the end turns of each of said coils and adapted to rigidly secure said coils in a predetermined angular relation, said member forming an abutment for the device.

8. A valve spring device including a plurality of helical coils and a terminal member having spiral grooves to receive the end turns of the coils, and deformable to rigidly clamp said end turns in interspaced relation.

9. A spring device for the valves of high speed engines having a rate of action sufficient to prevent induced vibration at speeds within the engine range, comprising helical coils of substantially equal stiffness and size, and means to permanently secure adjacent ends of the helices in fixed relation.

10. A spring device for engine valves wherein the natural frequency of the spring is higher than the frequency of the valve impulses at speeds within the engine speed range, comprising a plurality of resilient coils having the turns of each coil disposed between the adjacent turns of the other coils.

11. A spring device for high speed engine valves having a natural frequency higher than the frequency of the valve impulses at speeds within the engine speed range, comprising coaxial helices joined together at one end, a retainer member threaded to both helices at the end of the device, and means to rigidly secure the helices to said member.

12. A spring device for engine valves wherein the natural frequency of the spring is higher than the frequency of the valve impulses at speeds within the engine speed range, comprising coaxial helices of substantially equal stiffness joined together at one end.

13. A spring device for engine valves having a high rate of action in proportion to the weight of its active turns, comprising a plurality of helical coils of equal stiffness arranged on a common axis with the turns of each coil between the turns of the other coils, whereby the total stress per coil is minimized.

14. An engine valve spring comprising coaxially arranged helical coils of substantially the same size, and separately formed abutment pieces at the ends of the spring and to which the coils are secured for retaining them in their proper angular relationship.

15. An engine valve spring comprising two coaxially arranged helical coils of substantially the same size, and means at one end of the spring to retain the two coils substantially 180° apart angularly.

16. An engine valve spring comprising two coaxially arranged helical coils of substantially the same size, and means at one end of the spring to retain the two coils in fixed angular position relative to each other.

17. An engine valve spring comprising two coaxially arranged helical coils, and means at one end of the spring to retain the two coils in fixed angular relation to each other.

18. An engine valve spring comprising two coaxially arranged helical coils, and means at one end of the spring for definitely securing the adjacent coil ends together so that one coil may modify or restrict the action of the other coil.

19. An engine valve spring comprising at least two helical coils arranged in close proximity, and means so interconnecting at least two of said coils that one of them may modify or restrict the action of another of said coils.

20. A spring device for high speed valves comprising two coaxially arranged helical coils, and a retainer at one end of the spring having depressions for the end turns of the coils to maintain the relative disposition thereof.

21. A spring device for high speed valves comprising two coaxially arranged helical coils, and means formed integral with the coils at one end of the spring and so connecting the coils that they are retained in fixed angular relation to each other.

22. A spring device for valves comprising two coaxially arranged helical coils, the turns of each of the coils at one end of the spring being wound with a decreased pitch so that at least one of the turns of one coil is in contact with the adjacent turn of the other coil, and means interconnecting the adjacent ends of the coils at the end of the spring having the contacting turns.

In testimony whereof I affix my signature.

WALTER R. GRISWOLD.